(12) United States Patent
Zhou et al.

(10) Patent No.: US 11,199,735 B2
(45) Date of Patent: Dec. 14, 2021

(54) SMART OPTICAL FILTER FOR PIXEL-SELECTIVELY ADJUSTING LIGHT INTENSITY

(71) Applicant: Lumcolor, Chino, CA (US)

(72) Inventors: Rich S. Zhou, Chino, CA (US); Yingchun Han, Chino, CA (US); Kenny Chu, Chino, CA (US)

(73) Assignee: Lumcolor, Chino, CA (US)

( * ) Notice: Subject to any disclaimer, the term of this patent is extended or adjusted under 35 U.S.C. 154(b) by 0 days.

(21) Appl. No.: 16/367,262

(22) Filed: Mar. 28, 2019

(65) Prior Publication Data

US 2020/0310178 A1    Oct. 1, 2020

(51) Int. Cl.
*G02F 1/133* (2006.01)
*G02F 1/137* (2006.01)
*G02F 1/1335* (2006.01)

(52) U.S. Cl.
CPC .......... *G02F 1/13318* (2013.01); *G02F 1/137* (2013.01); *G02F 1/133528* (2013.01)

(58) Field of Classification Search
None
See application file for complete search history.

(56) References Cited

U.S. PATENT DOCUMENTS

| | | | | |
|---|---|---|---|---|
| 6,930,723 B1 * | 8/2005 | Tsuda | ..................... | H04N 5/238 348/360 |
| 7,009,680 B2 * | 3/2006 | Cavanaugh | ............. | G02F 1/216 349/18 |
| 8,040,425 B2 * | 10/2011 | Shibuya | ................. | H04N 9/735 348/342 |
| 9,930,263 B2 * | 3/2018 | Terasawa | ............. | H04N 5/2356 |
| 10,488,700 B2 * | 11/2019 | Jung | ................. | G02F 1/134309 |

(Continued)

FOREIGN PATENT DOCUMENTS

KR     20070069653 A   *  7/2007   ............. H04N 5/225

OTHER PUBLICATIONS

Kim et al.; Apparatus and Method for Controlling Auto Exposure of Digital Camera; Jul. 2007; Pantech & Curitel Comm Inc; English Translation, pp. 1-5 (Year: 2007).*

(Continued)

*Primary Examiner* — Cynthia Segura
(74) *Attorney, Agent, or Firm* — Kilpatrick Townsend & Stockton LLP (57) ABSTRACT

Embodiments provide a smart optical filter capable of dynamically adjusting brightness variations in incident lights in a FOV or an optical field before an image sensor receives the incident lights. The smart optical filter in accordance with the disclosure can be portable and mounted on various imaging devices such as a smart phone or a camera. The smart optical filter may comprises an light adjustment layer made of an adaptive optical materials such liquid crystals. Light intensity distribution can be obtained for an FOV of a device coupled to the smart optical filter. The light intensity distribution can be compared to one or more thresholds to obtain difference values pixels on the light adjustment layer. The difference value can be used to generate control signals to adjust light passing through the pixels. In some embodiments, the control signals may include information indicating an amount of voltage to be applied to the pixels to alter polarization at those pixels.

20 Claims, 8 Drawing Sheets

(56) References Cited

U.S. PATENT DOCUMENTS

| | | | | |
|---|---|---|---|---|
| 2002/0012064 A1* | 1/2002 | Yamaguchi | ............ | H04N 5/2254 348/362 |
| 2007/0019006 A1* | 1/2007 | Marcu | .................. | G02B 26/005 345/690 |
| 2009/0059101 A1* | 3/2009 | Wang | ........................ | G02B 3/14 349/2 |
| 2010/0090930 A1* | 4/2010 | Marcu | .................. | G02B 26/005 345/72 |
| 2011/0223673 A1* | 9/2011 | Profitt | ..................... | G01N 21/21 436/8 |
| 2011/0292488 A1* | 12/2011 | McCarthy | ............. | G02F 1/0147 359/265 |
| 2012/0068913 A1* | 3/2012 | Bar-Zeev | ........... | G02B 27/0172 345/8 |
| 2013/0088656 A1* | 4/2013 | Michihata | ............ | G02B 26/001 349/33 |
| 2013/0188074 A1* | 7/2013 | Nakabayashi | ......... | H04N 5/238 348/223.1 |
| 2014/0178061 A1* | 6/2014 | Saita | ........................ | G03B 7/18 396/241 |
| 2014/0247386 A1* | 9/2014 | Takagi | ..................... | G03B 7/00 348/362 |
| 2014/0300805 A1* | 10/2014 | Davis | ..................... | H04N 5/238 348/362 |
| 2015/0281547 A1* | 10/2015 | Terasawa | ............. | H04N 5/2357 348/226.1 |
| 2016/0252758 A1* | 9/2016 | Lee | ........................ | G02F 1/1323 348/135 |
| 2017/0336864 A1* | 11/2017 | Broz | ........................ | G09G 5/02 |
| 2018/0193662 A1* | 7/2018 | Lv | ........................ | A61B 5/0077 |
| 2020/0310013 A1* | 10/2020 | Gruver | ................ | H04N 5/2254 |

OTHER PUBLICATIONS

Kim et al.; Apparatus and Method for Controlling Auto Exposure of Digital Camera; Jul. 2007; Pantech & Curitel Comm Inc; Abstract; English Translation (Year: 2007).*

* cited by examiner

Rectangular Type

FIG. 5

Circular Type

SMART OPTICAL FILTER FOR PIXEL-SELECTIVELY ADJUSTING LIGHT INTENSITY

FIELD OF THE INVENTION

The invention relates generally to enhancing optical imaging quality, and in particular to light intensity adjustment through an optical filter.

BACKGROUND OF THE INVENTION

An image sensor or imager is a sensor that detects and conveys information used to make an image. It does so by converting the variable attenuation of light waves (as they pass through or reflect off objects) into signals, small bursts of current that convey the information. The waves can be light or other electromagnetic radiation. Image sensors are used in electronic imaging devices of both analog and digital types, which include digital cameras, camera modules, medical imaging equipment, night vision equipment such as thermal imaging devices, radar, sonar, and others. As technology changes, digital imaging tends to replace analog imaging.

SUMMARY OF THE INVENTION

Embodiments provide a smart optical filter capable of dynamically adjusting brightness variations in incident lights in a field (FOV) or an optical field before an image sensor receives the incident lights. The smart optical filter in accordance with the disclosure can be portable and mounted on various imaging devices such as a smart phone or a camera.

The optical filter in accordance with the disclosure may comprise adaptive optical materials including one or more of opto-electrical crystals, dynamic optical polymers, liquid crystals and/or any other adaptive optical materials. The optical filter in accordance with the disclosure can generate a control signal to control adjustment of a light transparency level at a pixel on the optical filter based on a light intensity distribution detected by a pre-sensor. In some embodiments, this may involve obtaining a light intensity value at a spot in the FOV and comparing the light intensity value with a predetermined threshold. It may also involve determining a difference value between the light intensity value at the spot with a predetermined threshold based on the comparison and generating the control signal based on the difference value. The control signal may include information indicating a location of the pixel on the optical filter where the light passing through should be adjusted based on the difference value. In some embodiments, an amount of voltage may be applied to the pixel according to the control signal to achieve the light adjustment.

Other objects and advantages of the invention will be apparent to those skilled in the art based on the following drawings and detailed description.

DETAILED DESCRIPTION

Human eyes are known to be able to adaptively adjust the "effective sensitivity" of retinal via visual neurons. Therefore, humans can perceive objects under various light conditions. However, current photo image sensors are much limited compared with human eyes in terms of sensitivity to incident light intensity levels. For example, it has been a challenge for optical image sensors to produce quality images when there are brightness variations in different zones in the field of view (FOV) of an optical image sensor. This drawback can result in an image being saturated in bright zones or having no response at all in dark zones when there such brightness variations in FOV. Either would lead to information loss in the image.

Figure 1A:
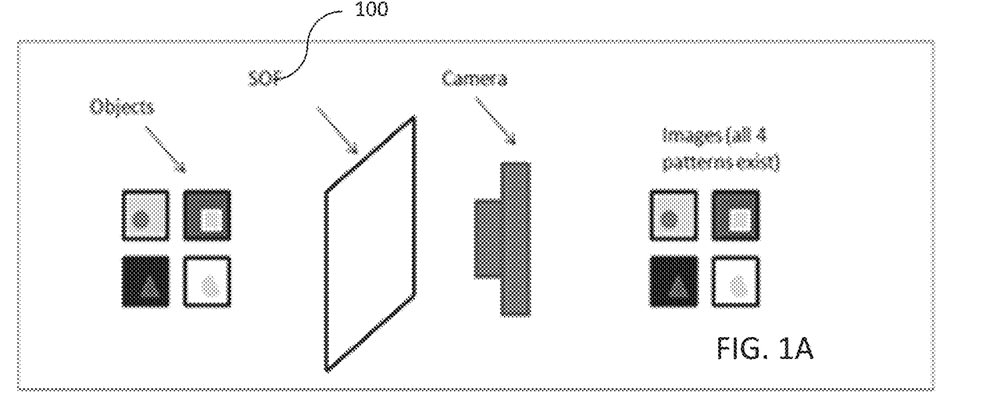
FIG. 1A illustrates generally a scenario where a smart optical filter in accordance with the disclosure is used to improve image quality.
Figure 1B:
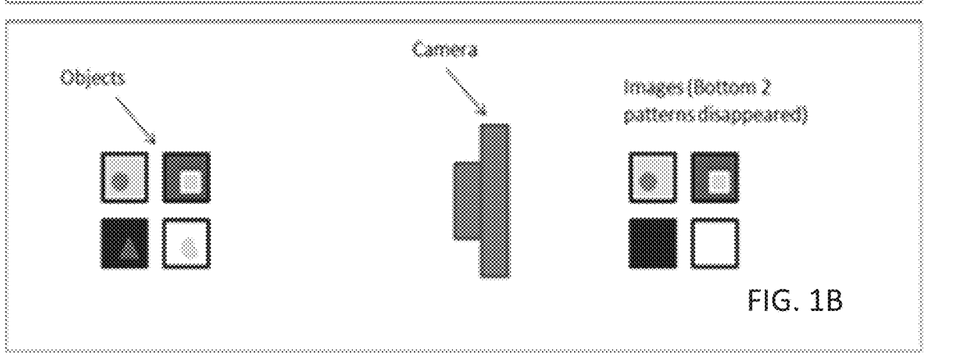
FIG. 1B illustrates how traditional imaging under brightness variations may impact image quality.

FIG. 1B illustrates how traditional imaging under brightness variations may impact image quality. This is conceptualized in FIG. 1B by showing 4 zones in an image of objects captured by a traditional camera. The different shadings of the zones in FIG. 1B represent different brightness level for the objects under the light condition when the objects are captured on the image. As shown, the bottom right zone is the brightest of all, and the bottom left zone is the darkest of all. Due to the dynamic range of response on light sensitivity of the image sensor(s) on the camera is limited as described above, the bottom two pixels in the image may "disappear" in a sense that details of the objects at those zones are not shown in the image, thus leading to aforementioned information loss in the image.

One motivation behind the present disclosure is to facilitate adjusting variations in brightness in a FOV of image sensor of an imaging device such that intensities of incident lights in the FOV are adjusted before the image sensor receives them. That is, if intensities of lights in brighter zones in the FOV can be somehow toned down to match the rest of light intensities in the FOV and/or vice versa, the aforementioned imaging problem can be somewhat addressed.

However, a challenge for achieving this is form factor and cost. Naturally, a good solution should lie in simple of use and being viable even for the ever increasing digital imaging for casual users. Another challenge is that brightness variations in the FOV are typically random. That is, locations of brighter zones in the FOV are not known until the lights hit the image sensor. While there are some existing solutions employing filtering of lights before they hit the image sensor, these solutions presume certain patterns of lights and thus may only work in a limited number of situations where brightness variations in the FOV are consistent with those patterns.

Optical Smart Filter in General

In accordance with the disclosure, embodiments provide a smart optical filter capable of dynamically adjusting brightness variations in incident lights in a FOV or an optical field before an image sensor receives the incident lights. The smart optical filter in accordance with the disclosure can be portable and mounted on various imaging devices such as a smart phone or a camera. FIG. 1A illustrates generally a scenario where a smart optical filter 100 in accordance with the disclosure is used to improve image quality. As shown, objects in a FOV may be illuminated by incident lights with different brightness levels at different spots on the objects, which is similar to that in FIG. 1B as described above. As shown, the smart optical filter 100 in accordance with disclosure is placed in front of the camera. The smart optical filter 100 can be configured to adjust light transparency at different zones on the smart optical filter 100 such that light transparency at a zone on the smart optical filter 100 corresponding to the bottom right zone can be adjusted to block most of the lights at that spot from hitting the image sensor of the camera; and light transparency at a zone on the smart optical filter 100 corresponding to the bottom left pixel can be adjusted to let most of the lights at that zone through to hit the image sensor of the camera. As shown, this can result in the bottom two zones of the image showing the details of the objects, which is an improvement over the image shown in FIG. 1B.

It should be understood the example shown in FIG. 1 is just mere illustration of concept of the smart optical filter in accordance with the disclosure, hence is not intended to be limiting. The light transparency adjustment by the smart optical filter 100 in accordance with the disclosure is dynamic such that any zone on the smart optical filter may be adjusted depending on the light condition. For instance, in some other situations where the top right pixel is the brightest, the smart optical filter 100 can adjust the light transparency at a zone on the smart optical filter 100 corresponding to those pixels to block most of the light. That is, the light transparency level adjustment by the smart optical filter 100 is dynamic depending on the light condition in the FOV.

A key to such dynamic light transparency level adjustment lies in an adaptive optical material employed by the smart optical filter 100. Several adaptive optical materials such as opto-electrical crystals, dynamic optical polymers, and liquid crystals have optical properties such as transmittance, polarization, as well as phases that can be employed to adjust transmittance level of lights passing though these materials. For example liquid crystal has advantages in manufacturability, lower driving voltages, and effective cost, has been widely applied in real-time display industry.

Figure 2A:
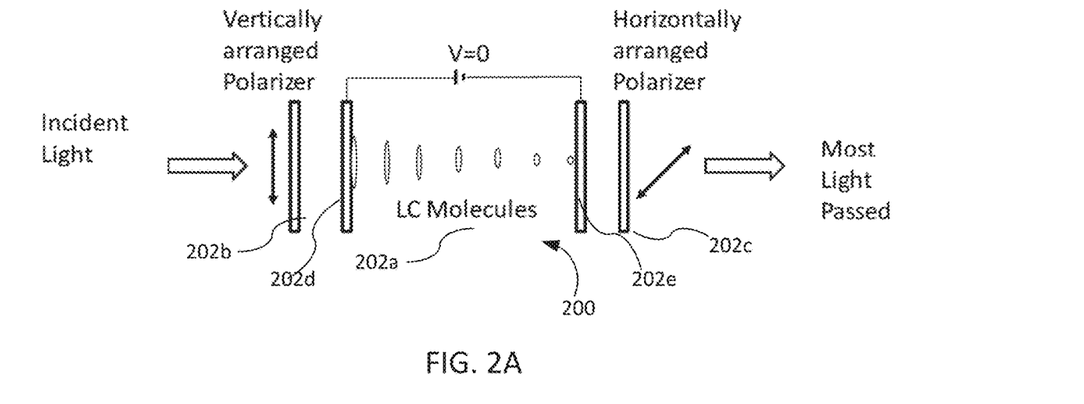
FIG. 2A illustrates a configuration of the liquid crystal modules in an smart optical filter in accordance with the disclosure where most of the lights can be let pass though at a first pixel on the smart optical filter.
Figure 2B:
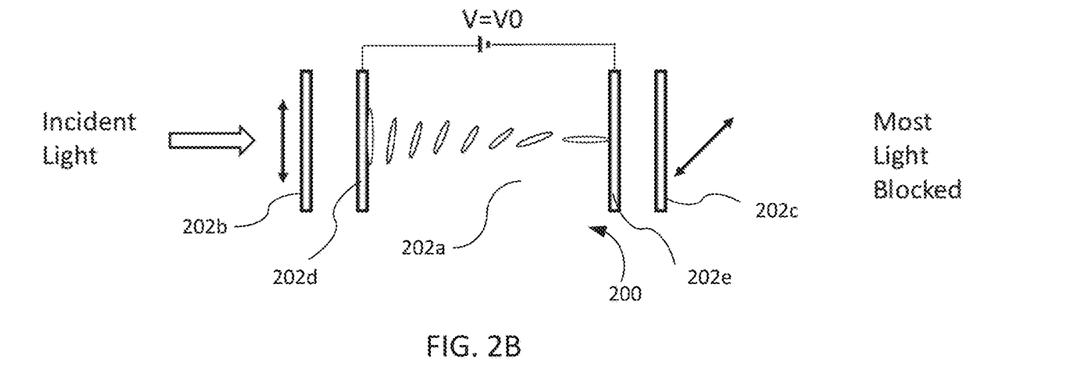
FIG. 2B illustrates an configuration of the liquid crystal modules in an smart optical filter in accordance with the disclosure where most of the lights can be blocked at a second pixel on the smart optical filter.
Figure 2C:
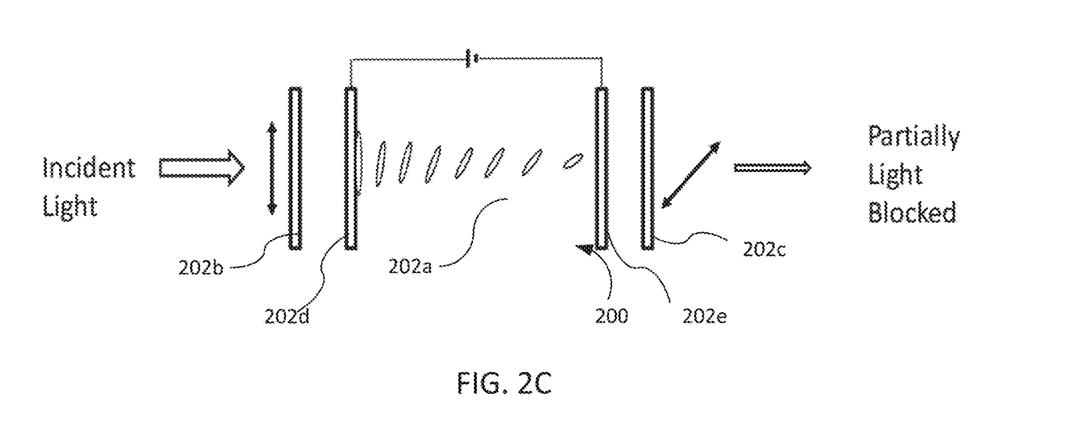
FIG. 2c illustrates a configuration of the liquid crystal modules in an smart optical filter in accordance with the disclosure where some of the lights can be blocked and some of the lights can be let pass through at a third pixel on the smart optical filter.

FIGS. 2a-c illustrates an example smart optical filter 200 in accordance with the disclosure from the perspective of an optical material employed. In this example, as can be seen liquid crystal is used in the smart optical filter 200. As shown, the smart optical filter 200 comprises a layer 202a having liquid crystal modules. FIG. 2a illustrates a configuration of the liquid crystal modules in the smart optical filter 200 where most of the lights can be let pass though at a first pixel on the smart optical filter 200. FIG. 2b illustrates a configuration of the liquid crystal modules in the smart optical filter 200 where most of the lights can be blocked at a second pixel on the smart optical filter 200. FIG. 2c illustrates a configuration of the liquid crystal modules in the smart optical filter 200 where some of the lights can be blocked and some of the lights can be let pass through at a third pixel on the smart optical filter 200.

As shown, liquid crystal molecules in each pixel on the layer 202a can be aligned between two transparent electrodes 202d and 202e, and the two polarizers 202b and 202c can be arranged such that the polarization axes are perpendicular to each other. Under this arrangement, when there is no liquid crystal between the polarizers, light passing through the first polarizer 202b one would be blocked by the second (crossed) polarizer 202c. Before an electric field is applied, the orientation of the liquid-crystal molecules can be determined by the alignment at the surfaces of electrodes. In a twisted nematic (TN) device, the surface alignment directions at the two electrodes are perpendicular to each other, and so the liquid crystal molecules can arrange themselves in a helical structure, or twist. As explained above, the orientation of the liquid crystal can be used to induce the rotation of the polarization of the incident light, thus the layer 202a act as an adjustable light transparency filter. That is, when the applied voltage is large enough, the liquid crystal molecules in the center of the layer can almost be completely untwisted and the polarization of the incident light is not rotated as it passes through the liquid crystal layer—see for example FIG. 2B. This light will then be mainly polarized perpendicular to the second polarizer, and thus be blocked and the pixel will appear darker. By controlling the voltage applied across the liquid crystal layer in each pixel, light can be allowed to pass through in varying amounts—see for example FIG. 2C. As shown, in the three configurations in FIGS. 2A-C, different voltages are applied to impact the orientations of the liquid crystal modules in the layer 202 to achieve different light transparency levels.

Example Implementations of the Smart Optical Filter

Figure 3:
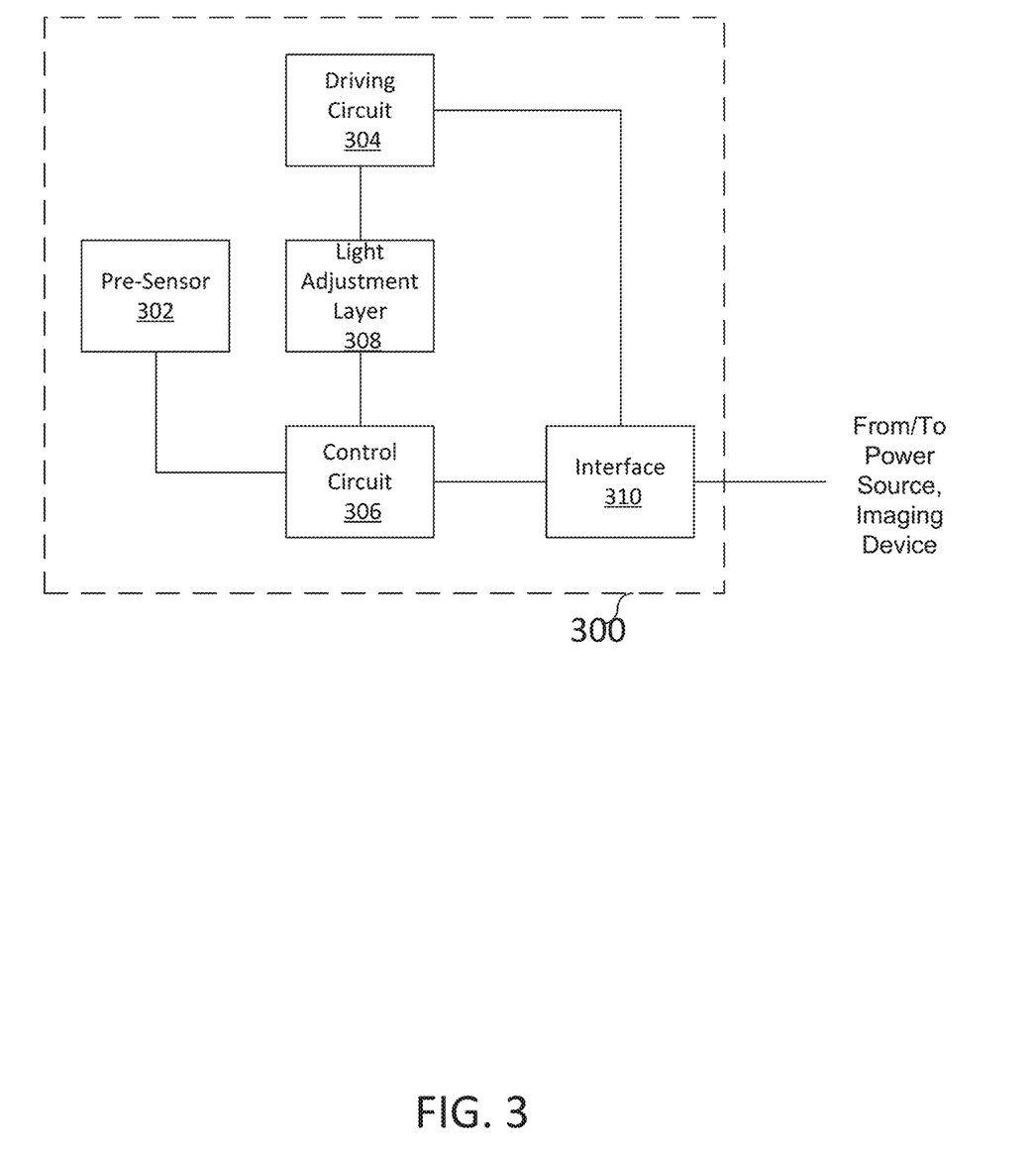
FIG. 3 illustrates an example implementation of an smart optical filter in accordance with the disclosure.

With general principles of the smart optical filter in accordance with the disclosure having been described and illustrated, attention is now directed to FIG. 3, where an example implementation of a smart optical filter 300 in accordance with the disclosure is illustrated.

In various embodiments, as shown in FIG. 3, the smart optical filter in accordance with the disclosure can be a segmented structure comprising optical materials, such as liquid crystal. As shown, the smart optical filter in accordance with the disclosure can have one or more of a pre-sensor 302, a driving circuit 304, a control circuit 306, a light adjustment layer 308, an interface 310, and/or any other components.

The pre-sensor 302 can be configured to detect light intensity distribution in an FOV. In some embodiments, the pre-sensor 302 may include an array of optical sensors. In some other embodiments, the pre-sensor 302 may include a low cost and low resolution pre-imager. Structure of the pre-sensor is not intended to be limited. It should be understood, the pre-sensor 302, as shown in FIG. 3, is contemplated to be a distinct and separate image sensor from the one included in an imaging device employing the smart optical filter 300. However, this is not necessarily the only case. In some other examples, it is contemplated that the pre-sensor 302 can be the same image sensor in the imaging device and is connected to the smart optical filter 300 through the interface 310. Output-wise, the pre-sensor 302 can be configured to generate the feedback control signals indicating different light intensities detected in the FOV.

The control circuit 306 can be configured to control adjustment of the light transparency level at various pixels on the light adjustment layer 308 based on the light intensity distribution detected by the pre-sensor 302. By way of illustration, the control circuit 306 may be configured with various thresholds corresponding to different light transparency levels for such adjustment. For example, transparency level adjustment may be instigated through a pixel on the light adjustment layer based on the intensity value of the light corresponding to pixel. In one embodiment, it is contemplated that the detected light intensity value at a given spot in the FOV is compared to one or more thresholds and determining a difference value with respect to the one or more thresholds. In that embodiment, the control circuit 306 may be configured to generate a control signal to adjust (e.g. smooth) the difference value. The control signal may include information indicating a location of the pixel on the light adjustment layer 308 and one or more instructions for adjusting the difference value.

The driving circuit 304 may be configured to generate driving signals to drive a given pixel on the light adjustment layer 308 in accordance with one or more control signals generated by the control circuit 306. In implementations, as shown, the driving circuit 304 may be connected with control circuit 306 and/or the light adjustment layer 308 through the interface 310. By way of illustration, the driving signals generated by the driving circuit 304 may involve an amount of voltage to be applied to electrodes at the given pixel, a duration for applying voltage, and/or any other controls.

The light adjustment layer 308 may comprise, polarizers, electrodes, optical materials divided in to pixels and/or any other elements. An example of light adjustment layer 308 is shown in FIGS. 2A-C. As shown in FIGS. 2A-C, for example, each pixel of the layer 308 may comprise, two polarizers, two electrodes (i.e. an individual positive one and a common ground) and optical materials such as liquid crystal modules. As also shown in FIG. 2A-C, an orientation of, for example, the liquid crystal modules can be adjusted by applying different amount voltage to the electrodes through the driving signals generated by the driving circuit 304. In this way, the light adjustment layer 308 can be manipulated dynamically and granularly in real-time to impact brightness distribution of the optical field after passing through the light adjustment layer 308.

The interface 310 can be configured to provide interfacing among the various modules shown in FIG. 3. In some embodiments, the interface 310 can be configured provide interfacing between the smart optical filter 300 and imaging device employing the smart optical filter 300. For example, in one embodiment, it is contemplated the smart optical filter 300 is connected/coupled directly to the final imaging device through the interface 310 such that when the imaging device is activated to capture a pre-image, the smart optical filter 300 is also activated to adjust the light intensity passing through the smart optical filter 300 before they hit the same image sensor of the imaging device. In another embodiment, it is contemplated, the smart optical filter is connected to a power source, e.g., a low voltage battery, a solar panel or a power source provided by the imaging device, through the interface 310.

Figure 4:
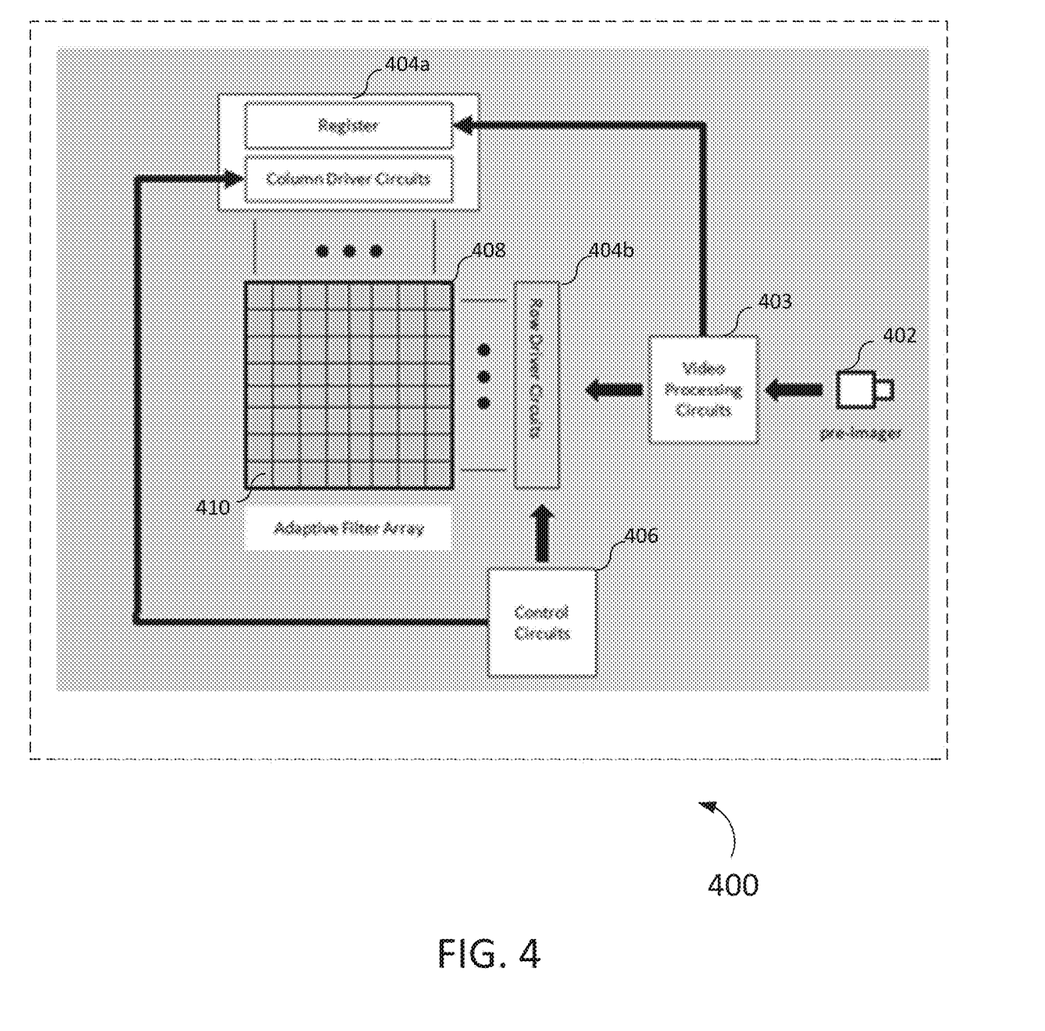
FIG. 4 illustrates another example implementation of a smart optical filter in accordance with the disclosure

FIG. 4 illustrates another example implementation of a smart optical filter 400 in accordance with the disclosure. In this example, the smart optical filter 400 employs an active matrix liquid crystal display for the light adjustment layer 408. In this example, the smart optical filter 400 also includes a video processing circuit 403 configured to generate and/or process one or more video signals based on the light detection by the pre-imager 402. The processed video signals, as shown, can be transmitted to the control circuit 406 and/or the driving circuits 404a or 404b for generating the control signals and/or the driving signals to adjust the transparency level of a given pixel/cell on the light adjustment layer 410. In this example, the light adjustment layer 408 comprises active matrix pixels divided into columns and rows. A given cell 410 on the light adjustment layer 408 thus can be configured with an associated row number and a column number. As shown, in this active matrix configuration the driving circuit can then be divided into a column driving circuit 404a and a row driving circuit 404b for driving column and row of pixels/cells on the light adjustment layer 408 if needed. That is, multiple pixels on the light adjustment layer 408 may be driven through the driving circuits 404a and/or 404b at a same time. As shown, the driving circuit, such as circuit 404a can have a register for storing various information for generating the driving signals as described herein.

Example Forms of the Smart Optical Filter

Figure 5:
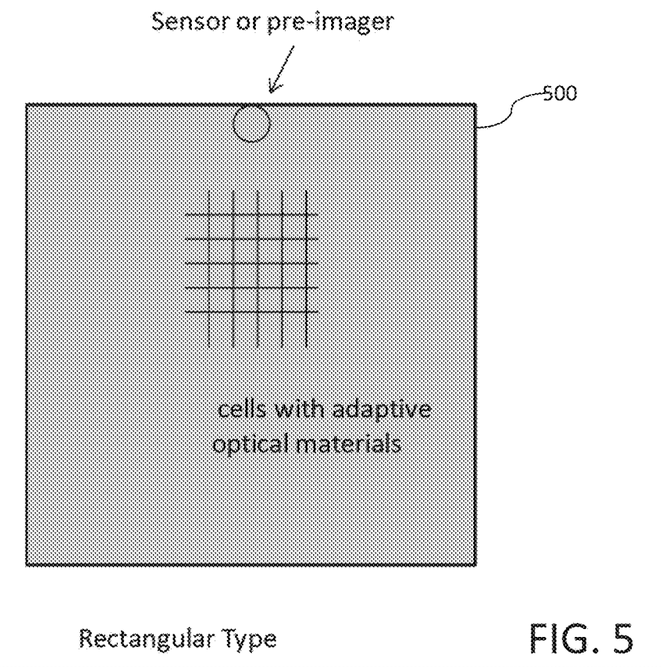
FIG. 5 illustrates an example configuration of smart optical filter 500 in a rectangular shape.
Figure 6:
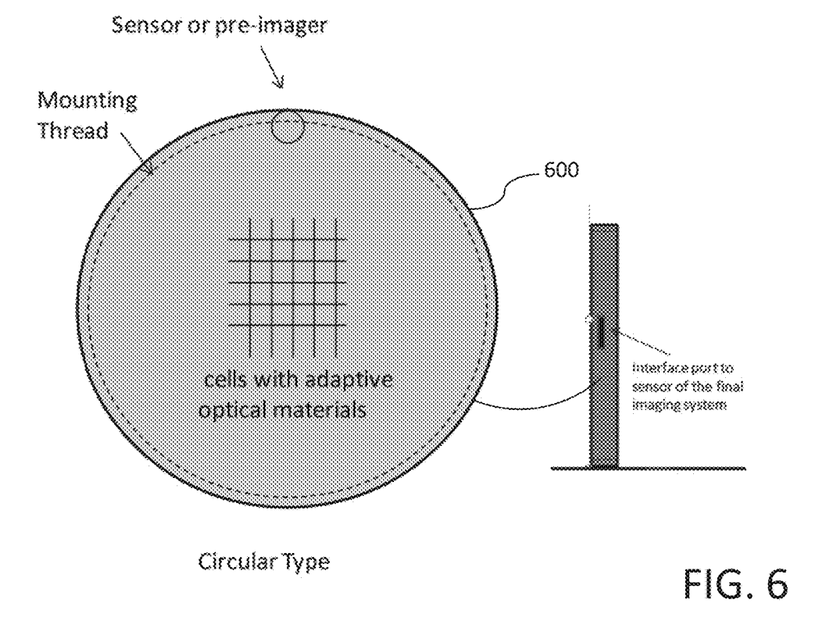
FIG. 6 illustrates an example configuration of smart optical filter in a circular shape

With example implementations of the smart optical filter in accordance with the disclosure having been described and illustrated, attention is now directed to FIGS. 5 and 6 where example configurations for different uses of the smart optical filter in accordance with the disclosure are illustrated. FIG. 5 illustrates an example configuration of smart optical filter 500 in a rectangular shape. In this configuration, the smart optical filter 500 comprises a built-in pre-image and does not need an electronic interface for interfacing with an imaging device. The smart optical filter 500 may be simply plugged-in mechanically just like used as a regular neutral density filter. In implementations, a set of mechanical position pins could be employed to help align the smart optical filter 500 to lens to register the relative pixels. However, this is not necessarily the only case. In some other embodiments, it is contemplated that smart optical filter 500 may not have a built-in pre-imager. In those embodiments, the smart optical filter 500 may have an electronic interface to obtain the brightness information of the incident optical field from one or more image sensors of the imaging device (i.e. the camera sensor) and to then drive the smart filter in real-time.

Figure 7:
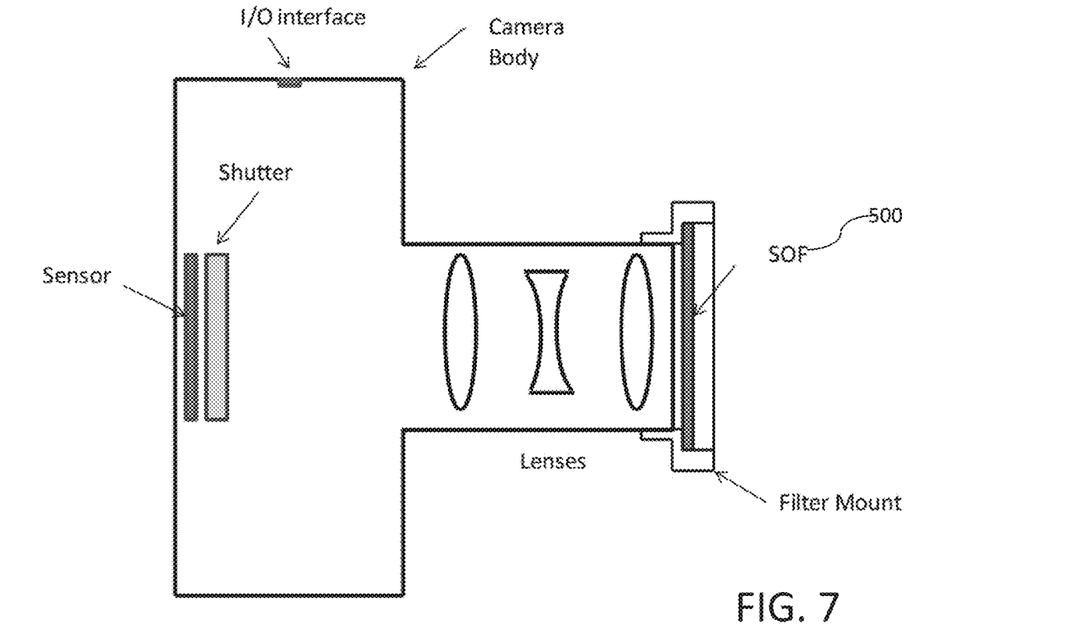
FIG. 7 illustrates one example of mounting the smart optical filter shown in FIG. 5 to an imaging device

FIG. 7 illustrates one example of mounting the smart optical filter 500 shown in FIG. 5 to an imaging device. As shown in this example, the smart optical filter 500 may be mounted to the imaging device—i.e., the camera as a stand-alone component. That is, in some embodiments, the smart optical filter 500 may not need to be connected to the imaging device through any electronic interface, but only through mechanical interfacing.

FIG. 6 illustrates an example configuration of smart optical filter 600 in a rectangular shape. In this configuration, the circular smart optical filter 600 can be employed to cover some or an entire area of an imaging lens of an imaging device (such as that of a camera). In this example configuration, the smart optical filter 600 comprises an interface port as shown. The interface port can be configured to enable the smart optical filter 600 to communicate with one or more image sensors of the imaging device employing the smart optical filter 600.

Figure 8:
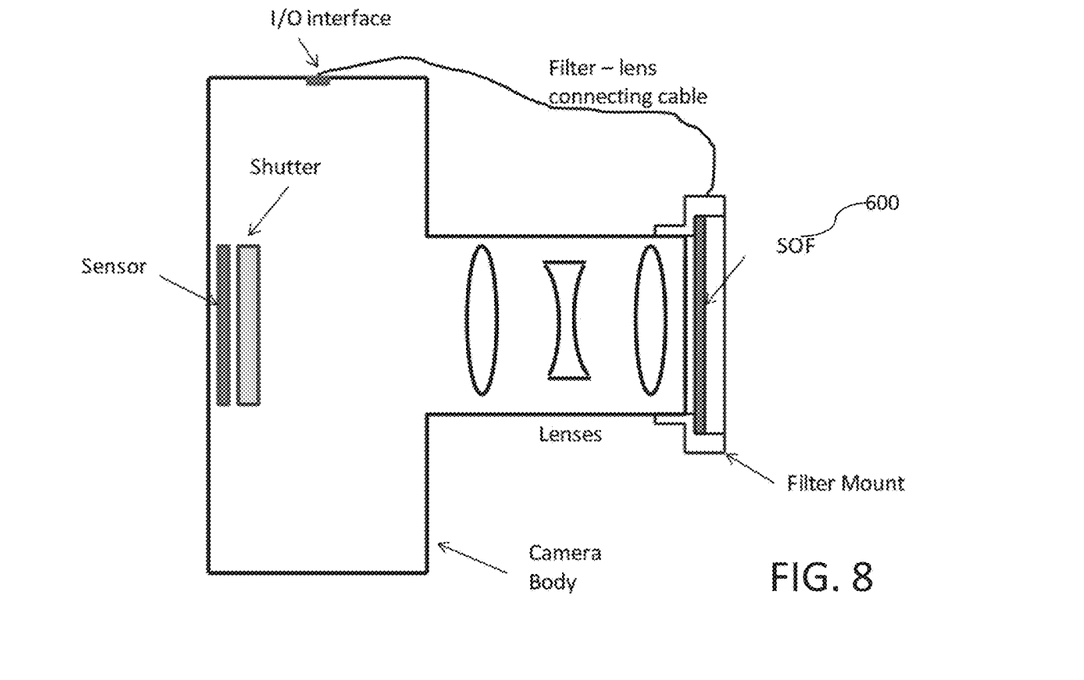
FIG. 8 illustrates one example of mounting the smart optical filter shown in FIG. 6 to an imaging device

FIG. 8 illustrates one example of mounting the smart optical filter 600 shown in FIG. 6 to an imaging device. As shown in this example, the smart optical filter 600 may be mounted to the imaging device—i.e., the camera as an integrated component. That is, in some embodiments, the smart optical filter 600 may be connected to the imaging device through one or more electronic interfaces and to share imaging/light information with the imaging device. The interfacing or linking between the pre-sensor in the smart optical filter 600 and the imaging device can be switched on or off to enable the smart optical filter 600 to act as a special natural density filter with a variable transmittance. In some embodiments, the smart optical filter 600 can include a built-in heater for ensuring proper operation of the smart optical filter 600 even in a cold environment.

Figure 9:
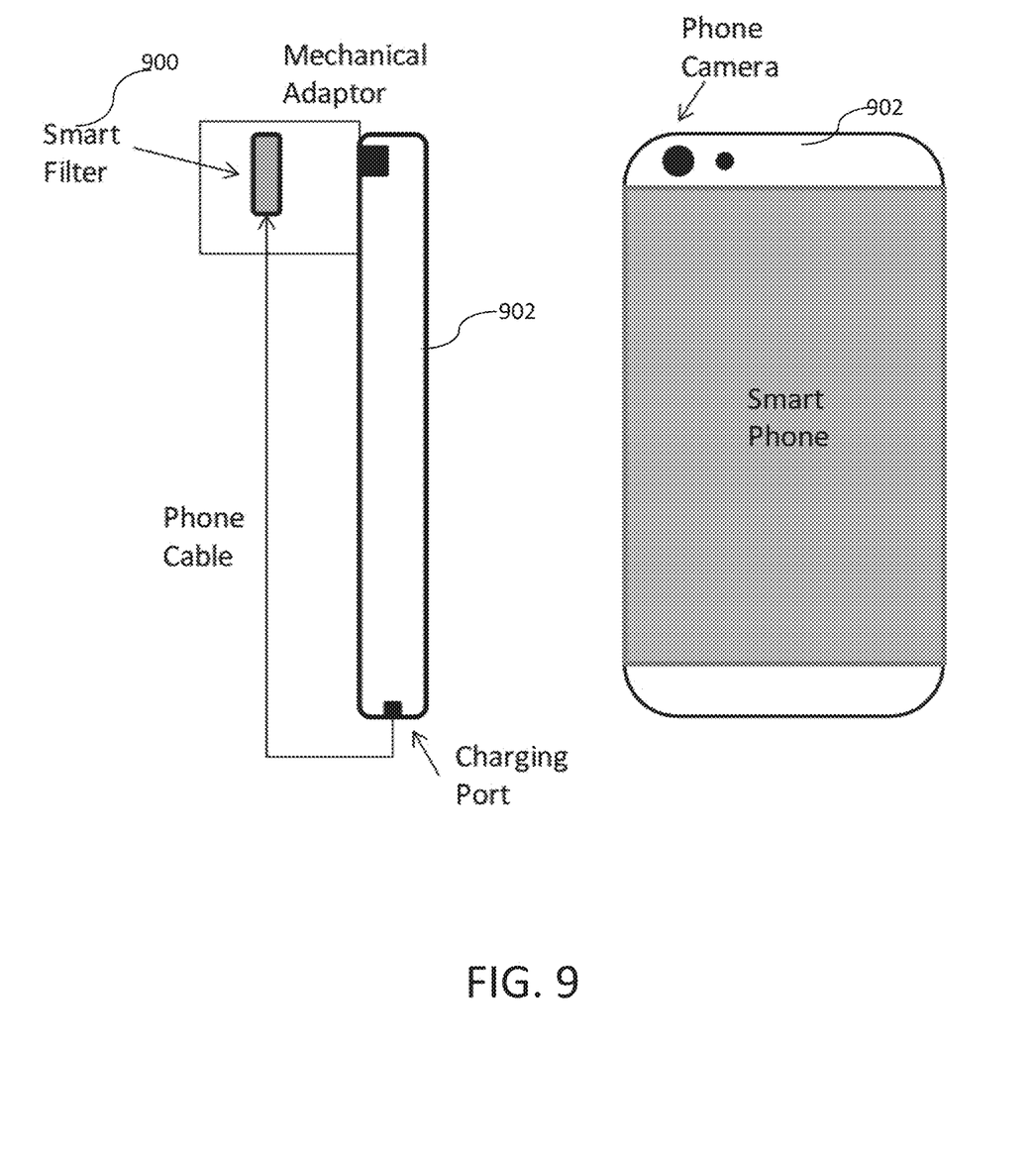
FIG. 9 illustrates an example of mounting a smart optical filter in accordance with disclosure to a smart phone

FIG. 9 illustrates an example of mounting a smart optical filter 900 in accordance with disclosure to a smart phone. As shown, in one embodiment, the smart optical filter 900 is mountable to the smart phone 902 on the back cover of the smart phone 902, where the image sensor of the smart phone 902 is located. As also shown, in this example, the smart optical filter 900 may be interfaced with the charging port of the smart phone 902 through a phone cable, such as a firewire cable. In this way, the firewire port on the smart phone 902 can be used to provide the information of original incoming optical field and to access the filter and to adjust the local transmittance in real-time. The much neutralized brightness distribution after passing through the smart optical filter 900 would greatly extending the range of field brightness that could be tolerated by the image sensor on the smart phone 902.

Figure 10:
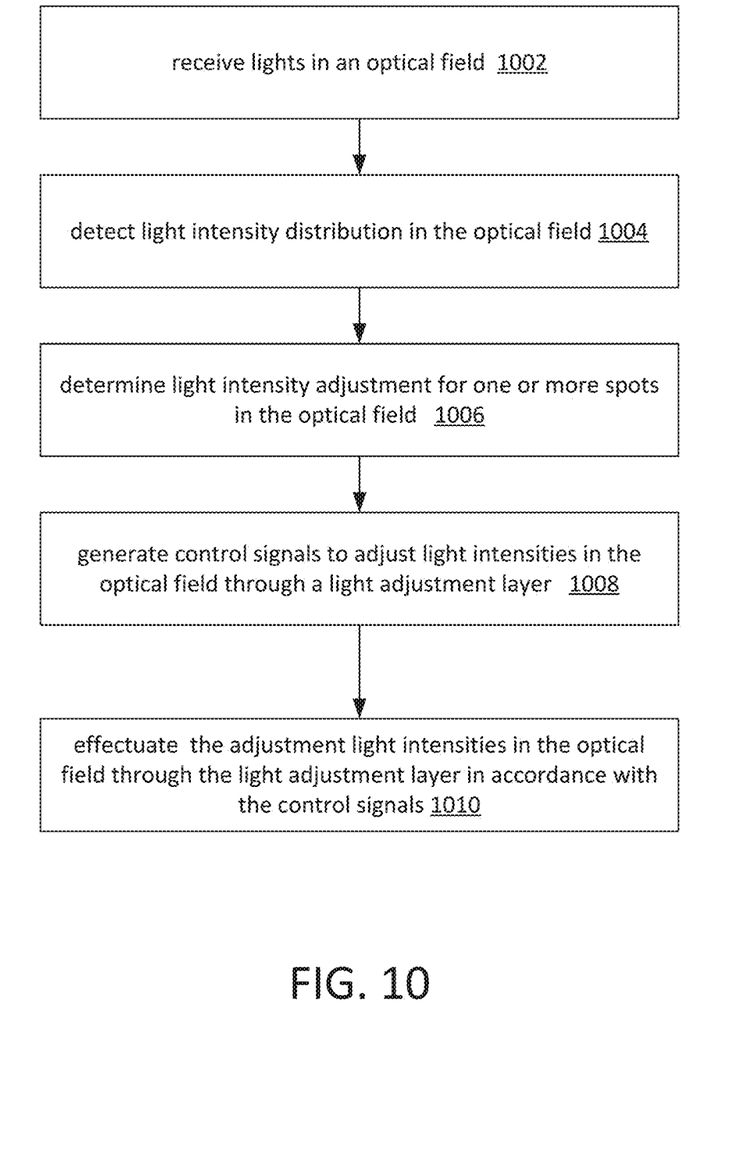
FIG. 10 is a flow diagram illustrating an exemplary method 1000 for facilitating adjustment of light intensities in an optical field using a smart optical filter in accordance with the disclosure.

FIG. 10 is a flow diagram illustrating an exemplary method 1000 for facilitating adjustment of light intensities in an optical field using a smart optical filter in accordance with the disclosure. It will be described with reference to FIGS. 1-9. The operations of method 1000 presented below are intended to be illustrative. In some embodiments, method 1000 may be accomplished with one or more additional operations not described and/or without one or more of the operations discussed. Additionally, the order in which the operations of method 1000 are illustrated in FIG. 10 and described below is not intended to be limiting.

In some embodiments, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, incident lights in an optical field may be received. In various implementations, operations performed at 1002 can be implemented using pre-sensor the same as or substantially similar to pre-sensor 302 as described and illustrated herein.

At an operation 1004, intensity distribution for the lights received at 1002 may be detected. This may involve detecting and/or generating intensity values for the lights received at 1002. In various implementations, operations performed at 1002 can be implemented using pre-sensor the same as or substantially similar to pre-sensor 302 as described and illustrated herein.

At an operation 1006, adjustment of light intensities in the optical field may be determined for one or more zones in the optical field. As described and illustrated herein, light intensities in the optical field may vary in certain situations that can lead information loss in an final image capturing one or more objects in the optical field. In some implementations, one or more thresholds for light intensities can be predetermined and stored. The light intensity values generated/detected at 1004 in those implementations can be compared with the one or more thresholds to determine respective difference values. These difference values can then be processed to determine amounts of adjustment for "smoothing"/"neutralizing" the light intensities differences reflected by the difference values. In some implementations, operation 1006 may be performed by a control circuit the same as or substantially similar to the control circuit 306 illustrated and described herein.

At an operation 1008, one or more control signals may be generated to adjust the light intensities from the optical field based on the adjustment determined at 1006. As described and illustrated herein, a smart optical filter in accordance with the disclosure can be employed to achieve such adjustment. The smart optical filter can comprise a light adjustment layer of optical material such as liquid crystal modules. The light adjustment layer may be divided into pixels corresponding to different zones in the optical field. An example of the light adjustment layer is provided in FIGS. 2A-C. The control signals generated at 1008 can include information for controlling an orientation of the optical material such as the liquid crystal modules at a given pixel on the light adjustment layer. In some implementations, operation 1006 may be performed by a control circuit the same as or substantially similar to the control circuit 306 illustrated and described herein.

At 1010, the adjustment of the light intensities in the optical filed can be effectuated through the light adjustment layer in accordance with the one or more control signals generated at 1008. In some implementations, operation 1010 may be performed by a driving circuit the same as or substantially similar to the driving circuit 304 illustrated and described herein.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An optical filter for pixel-selectively adjusting light intensity to achieve high dynamic range (HDR) imaging, the optical filter comprising:
    a pre-sensor configured to detect light intensity distribution in a field of view (FOV) of a device in which the optical filter is embedded;
    a light adjustment layer made of adaptive optical materials, the light adjustment layer comprising a set of pixels, wherein the pixels include a first pixel and a second pixel;
    a control circuit configured to generate control signals to control adjustment of one or more light transparency levels at the set of pixels based on the light intensity distribution detected by the pre-sensor, wherein the control signals includes a first control signal to control adjustment of a first light transparency level at the first pixel based on the light intensity distribution detected by the pre-sensor and a second control signal to control adjustment of a second light transparency level at a second pixel based on the light intensity distribution detected by the pre-sensor;
    a driving circuit configured to generate driving signals to control lights passing through the set of pixels based on the control signals generated by the control circuit; and
    an interface module configured to provide interfacing between the optical filter and the device such that when the device is activated to capture an image, the optical filter is activated to control the adjustment of the light transparency levels at the set of pixels; and, wherein the pre-sensor, the light adjustment layer, the control circuit, and the driving circuit are located within the optical filter.

2. The optical filter according to claim 1, wherein the adaptive optical materials include one or more of a opto-electrical crystals, dynamic optical polymers, and liquid crystals.

3. The optical filter of claim 1, wherein generating the first control signal to control adjustment of the first light transparency level at the first pixel based on the light intensity distribution detected by the pre-sensor comprises:
    obtaining a light intensity value at a first spot in the FOV from the light intensity distribution detected by the pre-sensor, wherein the first spot corresponds to the first pixel;
    comparing the light intensity value at the first spot with a predetermined threshold;
    determining a difference value between the light intensity value at the first spot with a predetermined threshold based on the comparison; and
    generating the first control signal based on the difference value; and, generating the second control signal to control adjustment of the second light transparency level at the second pixel based on the light intensity distribution detected by the pre-sensor comprises:
    obtaining a light intensity value at a second spot in the FOV from the light intensity distribution detected by the pre-sensor, wherein the second spot corresponds to the second pixel;
    comparing the light intensity value at the second spot with a predetermined threshold;
    determining a difference value between the light intensity value at the second spot with a predetermined threshold based on the comparison; and
    generating the second control signal based on the difference value.

4. The optical filter according to claim 1, wherein the first control signal includes information indicating a location of the first pixel on the light adjustment layer.

5. The optical filter according to claim 1, wherein the driving signals generated by the driving circuit includes a first amount of voltage to be applied to the first pixel and/or a first duration for which the voltage to be applied to the first pixel, and a second amount of voltage to be applied to the second pixel and/or a second duration for which the voltage to be applied to the second pixel, wherein the first amount voltage is separate and distinct from the second voltage.

6. The optical filter according to claim 1, wherein the first pixel comprises two polarizers and two electrodes.

7. The optical filter according to claim 6, wherein the first control signal indicates to the driving circuit an amount of voltage to be applied to the two electrodes of the first pixel such that the two polarizers are manipulated to block a portion of light passing through the first pixel.

8. The optical filter according to claim 1, wherein the set of pixels comprise active matrix pixels divided into columns and rows.

9. The optical filter according to claim 1, wherein the interface module comprises a set of mechanical position pins for aligning the optical filter or the filter is electronically registered to the resulted image.

10. The optical filter according to claim 1, wherein device is a smart phone and the interface module comprises an electrical interface for coupling the optical filter to the smart phone.

11. The optical filter according to claim 1, wherein a temperature of the light adjustment layer is controlled by an embedded electrical heater to avoid malfunction of the optical filter in a cold environment.

12. A method for using an optical filter pixel-selectively to adjust light intensity to achieve high dynamic range (HDR) imaging, wherein the optical filter comprises a pre-sensor, a mechanical or electronic registration, a light adjustment layer, a control circuit, and a driving circuit, wherein the light adjustment layer is made of adaptive optical materials and comprises a set of pixels including a first pixel, the method comprising:

detecting, using the pre-sensor, a light intensity distribution in a field of view (FOV) of a device in which the optical filter is embedded;

generating, by the control circuit, control signals to control adjustment of one or more light transparency levels at the set of pixels based on the light intensity distribution detected by the pre-sensor, wherein the control signals include a first control signal to control adjustment of a first light transparency level at the first pixel based on the detected light intensity distribution and a second control signal to control adjustment of a second light transparency level at a second pixel based on the light intensity distribution detected by the pre-sensor;

generating, at the driving circuit, driving signals to control lights passing through the set of pixels based on the control signals; and, wherein the pre-sensor, the light adjustment layer, the control circuit, and the driving circuit are located within the optical filter.

13. The method according to claim 12, wherein the adaptive optical materials include one or more of a opto-electrical crystals, dynamic optical polymers, and liquid crystals.

14. The method according to claim 12, wherein generating the first control signal to control adjustment of the first light transparency level at the first pixel based on the light intensity distribution detected by the pre-sensor comprises:

obtaining a light intensity value at a first spot in the FOV from the light intensity distribution detected by the pre-sensor, wherein the first spot corresponds to the first pixel;

comparing the light intensity value at the first spot with a predetermined threshold;

determining a difference value between the light intensity value at the first spot with a predetermined threshold based on the comparison; and generating the first control signal based on the difference value; and, generating the second control signal to control adjustment of the second light transparency level at the second pixel based on the light intensity distribution detected by the pre-sensor comprises:

obtaining a light intensity value at a second spot in the FOV from the light intensity distribution detected by the pre-sensor, wherein the second spot corresponds to the second pixel;

comparing the light intensity value at the second spot with a predetermined threshold;

determining a difference value between the light intensity value at the second spot with a predetermined threshold based on the comparison; and generating the second control signal based on the difference value.

15. The method according to claim 12, wherein the first control signal includes information indicating a location of the first pixel on the light adjustment layer.

16. The method according to claim 12, wherein the driving signals generated by the driving circuit includes a first amount of voltage to be applied to the first pixel and/or a first duration for which the voltage to be applied to the first pixel, and a second amount of voltage to be applied to the second pixel and/or a second duration for which the voltage to be applied to the second pixel, wherein the first amount voltage is separate and distinct from the second voltage.

17. The method according to claim 12, wherein the first pixel comprises two polarizers and two electrodes.

18. The method according to claim 17, wherein the first control signal indicates to the driving circuit an amount of voltage to be applied to the two electrodes of the first pixel such that the two polarizers are manipulated to block a portion of light passing through the first pixel.

19. The method according to claim 12, wherein the set of pixels comprise active matrix pixels divided into columns and rows.

20. The method according to claim 12, wherein device is a smart phone comprising an electrical interface for coupling the optical filter to the smart phone.

* * * * *